United States Patent [19]

Meirowitz et al.

[11] Patent Number: 5,200,130

[45] Date of Patent: Apr. 6, 1993

[54] METHOD OF MAKING POLYOLEFIN ARTICLES

[75] Inventors: Randy E. Meirowitz, Neenah; Robert J. Phelan, Appleton, both of Wis.

[73] Assignee: Kimberly-Clark Corporation, Neenah, Wis.

[21] Appl. No.: 628,232

[22] Filed: Dec. 17, 1990

[51] Int. Cl.$^5$ .............................................. B29C 47/06
[52] U.S. Cl. ...................................... 264/232; 156/167; 156/244.11; 264/211.13; 264/211.14; 264/341; 264/343; 427/322
[58] Field of Search ............... 264/130, 131, 232, 517, 264/518, 103, 341, 343, 129, 211.13, 211.14; 156/167, 244.11; 427/322

[56] References Cited

U.S. PATENT DOCUMENTS 3,366,721  1/1968  Burdge et al. ...................... 264/129

(List continued on next page.)

FOREIGN PATENT DOCUMENTS

| | | |
|---|---|---|
| 0128677 | 12/1984 | European Pat. Off. . |
| 0209775 | 1/1987 | European Pat. Off. . |
| 0221046 | 5/1987 | European Pat. Off. . |
| 0245074 | 11/1987 | European Pat. Off. . |
| 0255701 | 2/1988 | European Pat. Off. . |
| 50-052180 | 5/1975 | Japan . |
| 75-039756 | 12/1975 | Japan . |
| 53-007999 | 3/1978 | Japan . |
| 57-205585 | 12/1982 | Japan . |
| 57-2074640 | 12/1982 | Japan . |
| 58-018480 | 2/1983 | Japan . |
| 58-018481 | 2/1983 | Japan . |
| 59-112069 | 6/1984 | Japan . |
| 62-250260 | 10/1987 | Japan ........................ 264/103 |
| 62-289674 | 12/1987 | Japan . |
| 63-132625 | 6/1988 | Japan . |
| 1072484 | 6/1967 | United Kingdom . |
| 1143385 | 2/1969 | United Kingdom . |
| 1143944 | 2/1969 | United Kingdom . |
| 1155267 | 6/1969 | United Kingdom . |

OTHER PUBLICATIONS

"The Three Dimensional Solubility Parameter-Key to Paint Component Affinities; I. Solvents, Plasticizers, Polymers, and Resins" C. M. Hansen, *Journal of Paint Technology*, Feb., 1967, vol. 39, No. 505.

"The Three Dimensional Solubility Parameter-Key to Paint Component Affinities; II. and III." C. M. Hansen, *Journal of Paint Technology*, Aug. 1967, vol. 39, No. 511.

"The Universality of the Solubility Parameter" C. M. Hansen, *I & EC Product Research and Development*, Mar. 1969, vol. 8, No. 1.

"Interactions of Nonaqueous Solvents with Textile Fibers" B. H. Knox, et al., *Textile Research Journal*, Mar. 1975, pp. 203–217.

"Bimodal Character of Polyester-Solvent Interactions." B. H. Knox, *Journal of Applied Polymer Science*, vol. 21, pp. 225–276 (1977).

*Primary Examiner*—Jeffrey Thurlow
*Attorney, Agent, or Firm*—Thomas J. Mielke

[57] ABSTRACT

A generally hydrophobic polyolefin article is provided with a modified surface by contacting said generally hydrophobic polyolefin with a copolymeric material while said polyolefin is at a temperature above its glass transition temperature. The copolymeric composition includes a generally hydrophobic moiety and a modifying moiety. Also disclosed is a method for imparting the modified surface to a generally hydrophobic polyolefin which method involves contacting a generally hydrophobic polyolefin with a copolymeric material while said generally hydrophobic polyolefin is at a temperature above its glass transition temperature. In one preferred embodiment, the generally hydrophobic polyolefin is contacted with said copolymeric composition immediately after said polyolefin has been extruded and while said polyolefin is undergoing die swell.

11 Claims, 1 Drawing Sheet

U.S. PATENT DOCUMENTS

| | | | |
|---|---|---|---|
| 3,416,952 | 12/1968 | McIntyre et al. | 117/118 |
| 3,563,241 | 2/1971 | Evans | 264/518 |
| 3,954,928 | 5/1976 | Omori et al. | 264/51 |
| 3,959,421 | 5/1976 | Weber et al. | 264/6 |
| 4,045,510 | 8/1977 | Login | 260/830 P |
| 4,070,218 | 1/1978 | Weber | 156/167 |
| 4,277,430 | 7/1981 | Pekinpaugh et al. | 264/129 |
| 4,288,207 | 9/1981 | Wilkes | 425/72 S |
| 4,376,013 | 3/1983 | Wang | 162/274 |
| 4,392,903 | 7/1983 | Endo et al. | 156/167 |
| 4,404,314 | 9/1983 | Jabloner | 524/519 |
| 4,557,958 | 12/1985 | Barkis et al. | 156/244.11 |
| 4,578,414 | 3/1986 | Sawyer et al. | 524/310 |
| 4,734,445 | 3/1988 | Noda et al. | 523/201 |
| 4,735,843 | 4/1988 | Noda | 428/137 |
| 4,741,941 | 5/1988 | Englebert et al. | 156/176 |
| 4,785,030 | 11/1988 | Noda et al. | 523/201 |
| 4,804,378 | 2/1989 | Shiba et al. | 604/367 |
| 4,814,032 | 3/1989 | Taniguchi et al. | 264/103 |
| 4,814,131 | 3/1989 | Atlas | 264/129 |
| 4,824,451 | 4/1989 | Vogt et al. | 156/167 |
| 4,857,251 | 8/1989 | Nohr et al. | 264/103 |
| 4,876,289 | 10/1989 | Itoh et al. | 264/129 |
| 4,976,788 | 12/1990 | Nohr et al. | 264/39 |

METHOD OF MAKING POLYOLEFIN ARTICLES

BACKGROUND OF THE INVENTION

1. Field of the Invention

The present invention relates to improved polyolefin articles and a method of making such articles. Specifically, the present invention relates to a polyolefin article exhibiting a modified surface and a method of making the article.

2. Description of the Related Art

The use of various polyolefin compositions for forming a variety of shaped articles is known. For example, polyolefins are known to be useful in forming fibers which can be formed into a variety of woven and nonwoven materials. Such polyolefin materials generally possess a relatively hydrophobic (nonwettable) surface. When it is desired to employ a woven or nonwoven material in an absorbent product such as a diaper, bandage, adult incontinent product, training pant, feminine napkin, or the like, it is often desirable that such material exhibit a generally hydrophilic (wettable) surface in order to allow water to pass therethrough.

In the past, when it has been desired to employ a woven or nonwoven polyolefin material in a personal care product, for other than the backing material, it has been suggested to render the polyolefin material wettable (hydrophilic) by applying a surface treatment, such as a surfactant, to the polyolefin. Unfortunately, such surface treatments are generally fugitive in nature. That is, while appearing wettable for an initial application of liquid, after a given amount of water has passed through the polyolefin material, the surface treatment tends to wash off of the polyolefin material. Obviously, after the surface treatment has been washed off the polyolefin material, the polyolefin material is generally no longer capable of exhibiting a wettable (hydrophilic) surface and, instead, exhibits its natural hydrophobic surface.

When polyolefin materials are employed in personal care products, such as diapers, it is likely that they will be required to pass relatively large quantities of liquid waste and will be subjected to multiple insults of liquid waste. When polyolefin fabrics having a surfactant type surface treatment are employed in a diaper, they are generally capable of passing at least the first urine insult but become less capable of passing urine with each subsequent insult. Since a diaper may generally be subjected to three or more urine insults, surfactant treated polyolefin materials have proven generally unsatisfactory for use in certain applications.

Accordingly, attempts have been made to develop a surface treatment for polyolefin materials, which surface treatment is generally not fugitive, thereby rendering said polyolefin fiber wettable on a more permanent basis. For example, U.S. Pat. No. 4,578,414, issued Mar. 25, 1986, to Sawyer et al. is directed to wettable olefin polymer fibers. Described are olefin fibers which are rendered wettable by having incorporated therein at least one wetting agent of the group comprising (a) an alkyoxylated alkyl phenol along with a mixed mono-, di-, and/or tri-glyceride, or (b) a polyoxalkylene fatty acid ester, or (c) a combination of (b) and any part of (a). The invention is said to differ from the prior art by incorporating the surface active agent directly into the bulk polymer resin rather than introducing a copolymer or applying a surface treatment to fabricated fibrous structures.

When the surface active agent is incorporated directly into the bulk polymer resin, the surface active agent must migrate to the surface of the formed article in order to render the surface wettable. Certain disadvantages are associated with such a method. Initially, the blending of the surface active agent into the polymer, through a physical mixing, is a separate process which increases the cost of the final product. Additionally, the choice of surface active agent is limited in that the agent must be able to withstand mixing at elevated temperatures and must exhibit the desired migrating behavior, unless it shear segregates.

SUMMARY OF THE PRESENT INVENTION

It is desirable to produce a polyolefin article which possesses a modified surface, e.g., hydrophilic, which is less fugitive than known polyolefin articles exhibiting such a modified surface. Additionally, it is desirable to provide a method for modifying the surface of a polyolefin article.

These and other related goals are achieved by heat fusing a moiety of a copolymeric material to a generally hydrophobic base polyolefin. The copolymeric material comprises a generally hydrophobic moiety and a modifying moiety. The modifying moiety is generally insoluble in the polyolefin. The generally hydrophobic moiety is generally soluble in the polyolefin.

Heat fusing the copolymeric material to the polyolefin has been found to impart, to the polyolefin, a modified surface which is generally not fugitive.

In another aspect, the present invention concerns a method for providing a generally hydrophobic polyolefin with a modified surface. The method comprises contacting the generally hydrophobic polyolefin with a copolymeric material while said generally hydrophobic polyolefin is above its glass transition temperature. The copolymeric material comprises a generally hydrophobic moiety and a modifying moiety. The generally hydrophobic moiety is soluble in the polyolefin and the modifying moiety is generally insoluble in the polyolefin.

In a particularly preferred embodiment of the present invention, a polyolefin fiber, having a generally hydrophilic surface, is prepared by extruding a generally hydrophobic polyolefin in the shape of a fiber. As the generally hydrophobic polyolefin exits the extrusion die, the polyolefin is immediately contacted with the above described copolymeric material. At the point of contact, the extruded hydrophobic polyolefin is molten and is undergoing a degree of die swell. Contacting the polyolefin with the copolymeric material at this stage has proven particularly useful in producing a fiber which has a generally non-fugitive, hydrophilic surface.

DETAILED DESCRIPTION OF THE PREFERRED EMBODIMENT

Figure 1:
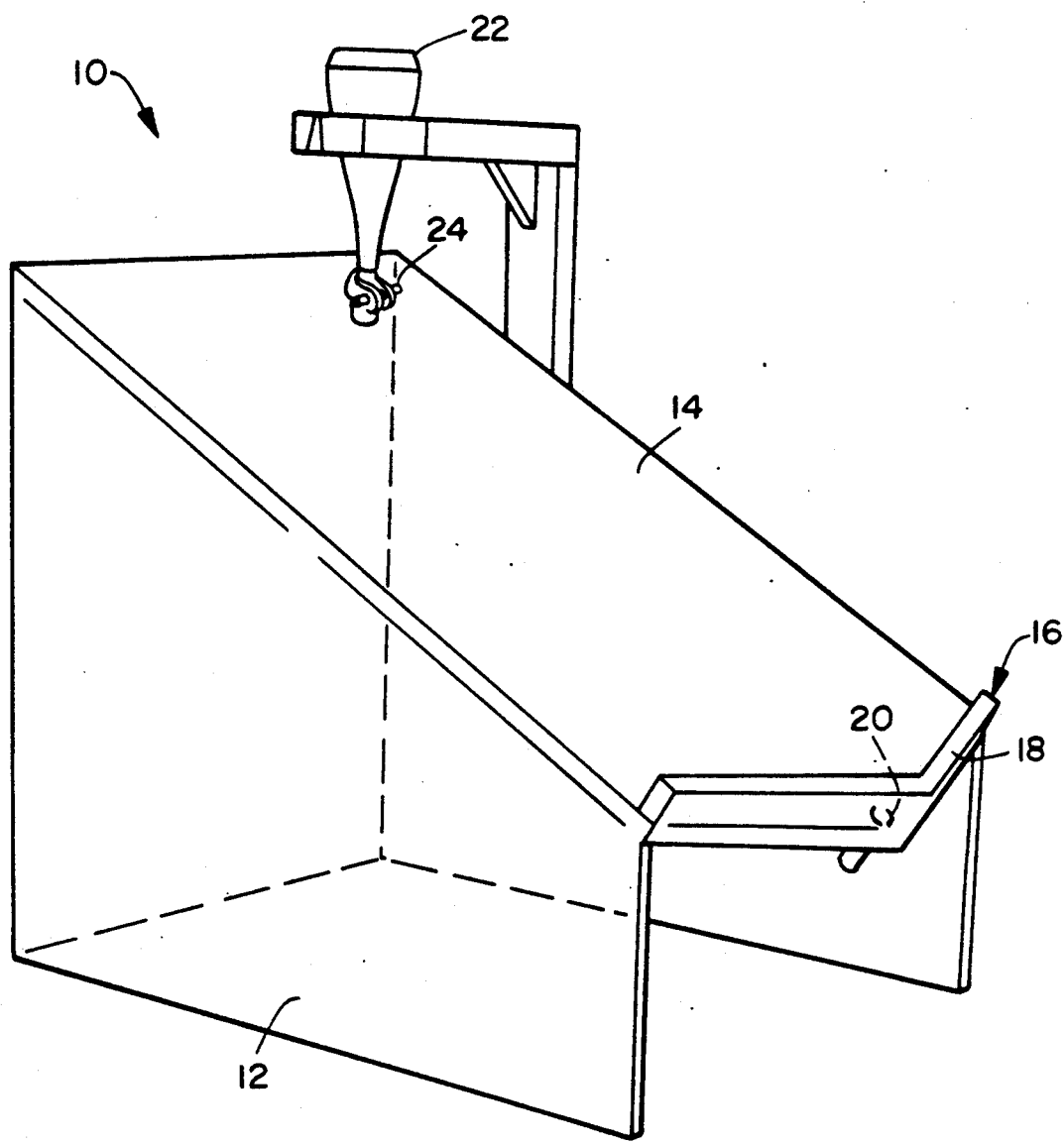
FIG. 1 is a perspective view of the test apparatus used to perform the run-off determinations.

The present invention concerns an article formed from a generally hydrophobic polyolefin which article has a modified surface. The invention further comprises a method by which such an article may be formed.

Polyolefins are known to those skilled in the art. Any polyolefin capable of being fabricated into an article is believed suitable for use in the present invention. Exemplary of polyolefins suitable for use in the present invention are the homopolymers and copolymers comprising repeating units formed from one or more aliphatic hydrocarbon, including ethylene, propylene, butene, pentene, hexene, heptene, octene, 1,3-butadiene, 2-methyl-1,3-butadiene, and the like. The polyolefins may be high or low density and may be generally linear or branched chain polymers.

The polyolefins, such as those described above, are generally hydrophobic in nature. As used herein, the term "hydrophobic" refers to materials having a contact angle of water in air of at least 90°. For the purposes of this application, contact angle measurements are determined as set forth by Good and Stromberg in "Surface and Colloid Science" Vol. II (Plenum Press, 1979).

According to the present invention, polyolefin articles formed from hydrophobic polyolefins are treated with a copolymeric material to produce a modified surface on such articles. Reference to a "modified" surface refers to the situation wherein the surface of the polyolefins treated according to the method of the present invention exhibit a characteristic not exhibited by the untreated polyolefin. Specifically, in one preferred embodiment, the modifying moiety is hydrophilic which causes the treated polyolefin to exhibit a hydrophilic surface. Thus, while an untreated polyolefin would generally exhibit a hydrophobic surface, the treated polyolefin may exhibit a hydrophilic surface. While reference herein may be made to the modifying moiety being hydrophilic, it is to be understood that other modifying moieties may be employed. For example, the modifying moiety may be abrasion resistant, chemical resistant, or water repellant. As used herein, the term "hydrophilic" refers to an article having a contact angle of water in air of less than 90° determined as set forth above in connection with the definition of "hydrophobic". Further, as used herein, the term "copolymeric" is intended to refer to a polymeric material formed from two or more monomers.

The copolymeric material of the present invention may be a linear polymer or a branched-chain polymer. Moveover, the copolymer may be a random copolymer, a block copolymer, a graft copolymer, or the like. The copolymeric material contains at least two distinct moieties. One of the moieties is generally hydrophobic with the second moiety being the modifying moiety, e.g., hydrophilic. A particular moiety will be considered to be generally hydrophilic or hydrophobic when a homopolymer, formed from repeating units of said moiety, produces a polymeric composition which exhibits, respectively, hydrophilic or hydrophobic characteristics as defined herein.

The generally hydrophobic moieties of the copolymeric material are soluble in the polyolefin present in the polyolefin article. As used herein, a particular hydrophobic moiety will be considered to be soluble in said polyolefin when a homopolymer, formed from repeating units of said moiety, is within the sphere of interaction for said polyolefin. For the purposes of this application, the sphere of interaction of a polyolefin is determined by Hansen solubility parameters as set forth by B. H. Knox in "Bimodal Character of Polyester-Solvent Interactions. I. Evaluation of the Solubility Parameters of the Aromatic and the Aliphatic Ester Residues of Poly(ethylene Terephthalate)" *Journal of Applied Polymer Science*, Vol. 21, pp. 225-247 (1977); "Bimodal Character of Polyester-Solvent Interactions II. Evaluation of the Chemical Structures of the Aromatic and Aliphatic Ester Residues of Poly(ethylene Terephthalate)" *Journal of Applied Polymer Science*, Vol. 21 pp. 249-266 (1977); and "Bimodal Character of Polyester-Solvent Interactions. III. The Effects of Morphology on the Nature of the Interaction of Nonaqueous Solvents with the Aromatic and the Aliphatic Ester Residues of Poly(ethylene Terephthalate)" *Journal of Applied Polymer Science*, Vol. 21, pp. 267-276 (1977); which articles and references cited therein are hereby incorporated by reference in their entirety. In the articles cited above, Knox discusses spheres of interaction in terms of polyesters. The teaching with respect to determining the spheres of interaction for polyesters can be applied to polyolefins by those skilled in the art.

For example, when the polyolefin is polypropylene, a generally hydrophobic moiety, which is soluble in the polyolefin, should have solubility parameters (dispersion, polar and H-bonding) falling completely within the range set forth below. The range is calculated using hexane as a model for an aliphatic hydrocarbon (dispersion 7.24, polar =0, H-bonding =0) in connection with the radii for the aliphatic residue of polyethyleneterephthalate as described in the articles by Knox cited above. The solubility parameters define the sphere of interaction.

|       |        | dispersion | polar | H-bonding |
|-------|--------|------------|-------|-----------|
| Range | (max.) | 9.405      | 2.21  | 2.21      |
|       | (min.) | 5.075      | 0     | 0         |

As a general rule, solubility of the generally hydrophobic moiety can be ensured by having said moiety comprise one of the repeating units present in the polyolefin from which the polyolefin article is formed. For example, if the article to be treated comprises polyethylene having repeating units represented by the following formula:

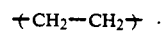

Solubility of the generally hydrophobic moiety can be ensured by having said moiety comprise repeating units represented by the formula:

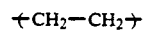

which repeating units are identical to repeating units present in the polyethylene.

Similarly, when the repeating units of the polyolefin are structurally similar to the hydrophobic moiety, solubility is more likely to occur. Thus it is seen that hydrophobic moieties comprising repeating units represented by the formula:

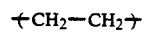

are generally soluble in polypropylene represented by the formula:

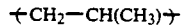

Exemplary of other moieties suitable for use as the hydrophobic moieties are saturated hydrocarbons, mono or polyunsaturated hydrocarbons, functionalized hydrocarbons, and the like.

The modifying moiety should generally not be soluble in the polyolefin from which the polyolefin article is formed. As used herein, the modifying moiety will be considered insoluble in the polyolefin when a homopolymer, formed from repeating units of said moiety, are not within the sphere of interaction for the polyolefin. Again, the sphere of interaction for a particular polyolefin can be determined as described by Knox.

For example, when the polyolefin is polypropylene, a modifying, generally hydrophilic moiety, which is insoluble in the polypropylene, should have solubility parameters (dispersion, polar, and H-bonding) which do not fall within the range set forth above.

Specifically, when the polyolefin article comprises polypropylene represented by the formula as set forth above, the modifying generally hydrophilic moiety may be represented by the following formula:

$$\text{+CH}_2\text{—CH}_2\text{—O+}$$

Thus when the polyolefin is polypropylene, the copolymeric material suitable for use in the present invention may be represented by the formula:

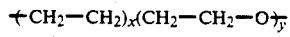
$$\text{+CH}_2\text{—CH}_2)_x(\text{CH}_2\text{—CH}_2\text{—O})_y$$

In the above example, the repeating unit parenthetically preceding the X is the generally hydrophobic moiety which is soluble in the polypropylene and the moiety parenthetically preceding the Y is a generally hydrophilic moiety which is generally insoluble in the polypropylene. Alternatively, the copolymeric composition may be represented by the following formulas:

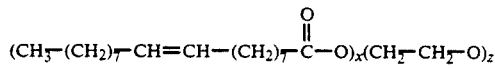
$$(CH_3\text{—}(CH_2)_7\text{—CH}=CH\text{—}(CH_2)_7\text{—}\overset{O}{\overset{\|}{C}}\text{—O})_x(CH_2\text{—CH}_2\text{—O})_z$$

or

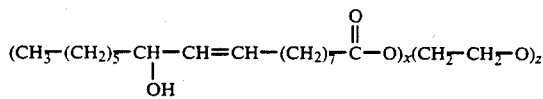
$$(CH_3\text{—}(CH_2)_5\text{—}\underset{OH}{CH}\text{—CH}=CH\text{—}(CH_2)_7\text{—}\overset{O}{\overset{\|}{C}}\text{—O})_x(CH_2\text{—CH}_2\text{—O})_z$$

wherein X and Z are integers. Again, the moiety parenthetically preceding the X is the generally hydrophobic moiety with the moiety generally preceding the Z representing a generally hydrophilic moiety.

Exemplary of other moieties which may form the modifying moiety of the copolymeric materials are $(CF_3)_x$, $(CF_2)_x$, $(SO_3)^-X^+$, $SiO_2$, $COOH$, $OH$, $NO_2$, $C\equiv N$, and the like. Exemplary of a $(SO_3)^-X^+$ moiety is $(SO_3)^-Na^+$ such as that on a sulfonated castor oil (sodium salt form).

The exact selection of the copolymeric material to use when treating a particular polyolefin material is relatively easily determined through experimentation. The requirements being that the copolymeric material comprise at least one generally hydrophobic moiety which is soluble in the polyolefin and at least one modifying, preferably generally hydrophilic, moiety which is generally insoluble in the polyolefin. It is to be understood that the copolymeric materials may comprise two or more generally hydrophobic moieties and/or two or more generally hydrophilic moieties. It is preferred that the copolymeric material have a weight average molecular weight ($M_2$) of less than about 10,000. For ease of application, it is most preferred that the copolymeric material be a liquid at room temperature ($\sim 23°$ C.).

The copolymeric material is heat fused to the polyolefin. As used herein, the term "heat fused" refers to the situation wherein the copolymeric material contacts the surface of the polyolefin article when the contacted polyolefin is at a temperature above its glass transition temperature. Reference to contacting the surface of the polyolefin article refers to the situation wherein the copolymeric material is topically applied to the polyolefin and is not intimately mixed with all of the polyolefin material. Applicants have discovered that heat fusion of the polyolefin and the copolymeric material as described herein produces a polyolefin having a modified surface, which is generally less fugitive than a similar modified surface which is not formed by heat fusion.

Without intending to be bound by any theory, it is hypothesized that heat fusion of the copolymeric materials to the polyolefin article causes the soluble, generally hydrophobic moieties, to dissolve in the polyolefin article and become entangled in the polymer chains of said polyolefin. The insoluble modifying moieties of the copolymeric materials do not dissolve in the polyolefin and tend to remain on the surface of the polyolefin article. In this way, the modifying moieties provide a modifying, e.g., hydrophilic character to the surface of the polyolefin.

Heat fusion differs from blooming methods described; for example, in U.S. Pat. No. 4,578,414 discussed above. According to blooming methods, a wetting agent is incorporated into a molten polyolefin material and is expected to "bloom" to the surface of fibers formed from the polyolefin/wetting agent blend. The wetting agent must be selected to exhibit this blooming phenomenon. Not all wetting agents will exhibit this behavior. For example, if the wetting agent is an A-B-A block copolymer wherein the A blocks are hydrophobic, the hydrophilic B block may not be able to bloom due to the strong attraction of the A blocks for the polyolefin material. Additionally, it is believed that a certain amount of almost all wetting agents will generally remain in the polyolefin and not bloom to the surface. Accordingly, higher concentrations of wetting agent must be employed to obtain a desired degree of wetting than would be necessary if all of the wetting agent could be utilized. By heat fusing the copolymer material to the polyolefin, the present invention does not require use of materials which bloom and is believed to more fully utilize the copolymeric materials employed.

When the modifying moiety is hydrophilic, heat fusion of the copolymeric materials to the polyolefin generally produces a more durable hydrophilic surface than known methods. However, it is possible for the hydrophobic moieties of the heat fused copolymeric materials to become disentangled from the polyolefin and be washed away. This is more likely to occur if the generally hydrophilic moiety of the copolymeric material is strongly hydrophilic; possessing a strong affinity for water. In such a case, when the polyolefin articles treated with said copolymeric materials are placed in an aqueous environment, the attraction of the hydrophilic moiety for water can be stronger than the forces holding the generally hydrophobic moiety in the polyolefin; thus, causing the hydrophobic moieties to be released from the polyolefin which allows the copolymeric material to pass into the water.

It is believed that A-B-A block copolymers may be preferred for use in the present invention. Specifically, since both A blocks are soluble in the polyolefin, the hydrophilic B block can be more firmly anchored to the polyolefin.

One method of determining whether or not the copolymeric material comprising a hydrophilic moiety is undesirably fugitive is to measure the surface tension of an aqueous phase in which a treated polyolefin article has been washed. If the copolymeric materials are fugitive and are pulled away from the polyolefin the surface tension of the aqueous phase will be lowered. In this manner, it is possible to compare the relative permanence of various surface treatments. This, of course, assumes the initial presence of a given, nonexcessive amount of the surface treatment. If an excessive amount of surface treatment is present, the excess can be expected to wash off. A polyolefin article having copolymeric material heat fused thereto, according to the present invention, will be considered to be less fugitive than a similar polyolefin article having copolymeric materials present thereon, but not heat fused thereto, when the polyolefin article according to the present invention can undergo more repeated wash/dry cycles while remaining wettable and without lowering the surface tension of the wash water as much as the article having the non-heat fused copolymeric materials thereon. The specific test method employed in conducting the wash/dry cycles is set forth below in connection with the examples.

As a general rule, it is desirable that the polyolefin articles according to the present invention be able to undergo at least 3 wash/dry cycles, described below in connection with the examples, without losing their hydrophilic character. Alternatively, it is generally desired that the articles undergo 3 wash/dry cycles without lowering the surface tension of the wash water employed in the third cycle more than 5 dynes per centimeter; preferably, at least 3 wash/dry cycles without lowering the surface tension of the wash water employed in the third cycle more than 3 dynes per centimeter.

Alternatively, it is desirable that the polyolefin articles according to the present invention be able to undergo at least 3 wash/dry cycles, described below in connection with the examples, without eliminating more than about 20 percent of the copolymeric material originally heat fused to the surface of the polyolefin article.

Methods of forming the polyolefins from which the polyolefin articles described herein are formed are known to those skilled in the art. Similarly, methods of forming the copolymeric compounds which form the surface treatments of the present invention are similarly well known. Moreover, a number of copolymeric compounds suitable for use in the present invention are commercially available. This will be discussed in greater detail below in connection with the examples.

In one preferred embodiment, the copolymeric materials of the present invention will comprise generally hydrophobic moieties and generally hydrophilic modifying moieties in a ratio of from 5:1 to about 1:5, preferably from about 2:1 to about 1:2. In the case where the concentration of generally hydrophobic moieties is relatively low compared to the number of hydrophilic modifying moieties, it is hypothesized that the copolymeric compositions may be more fugitive due to the stronger attractive forces between the hydrophilic moieties and water due to the relatively large number of hydrophilic moieties. Conversely, when there are a relatively large number of generally hydrophobic moieties compared to the number of hydrophilic moieties the copolymerizable compounds are believed to be generally less fugitive (also, possibly, rendering the surface less hydrophilic). This, of course, is dependent on the degree of solubility between the generally hydrophobic moieties and the polyolefin as well as the degree of hydrophilicity of the hydrophilic moieties.

As a general rule, it is desired that generally hydrophilic modifying moieties have molecular weights of from about 45 to about 3000 and, preferably, from about 150 to about 2000. It is generally desired that the hydrophobic moieties have molecular weights of from about 75 to about 3000 and, preferably, of from about 750 to about 2000. If the molecular weight of, for example, the hydrophobic moiety is less than about 75, the moiety lacks sufficient chain length to become dissolved and entangled in the polyolefin. In such a case, the copolymeric material may be undesirable fugitive. Conversely, if the molecular weight of the hydrophilic modifying moiety is greater than about 3000, the copolymeric material may be too strongly hydrophilic and may again be unduly fugitive.

The copolymeric materials of the present invention may be applied to the polyolefin articles in an amount sufficient to impart to said polyolefin articles the desired degree of surface modification. The amount of copolymeric material applied to the polyolefin articles will depend on a variety of factors including the relative effectiveness of the modifying moieties, the ratio of hydrophobic moieties to modifying moieties in the copolymeric materials, the relative insolubility of the modifying moiety (the more insoluble the modifying moiety is in polyolefin, the more modifying moieties will remain on the surface of the polyolefin article) and the like. Nonetheless, as a general rule, the copolymeric compositions will be applied to the polyolefin articles such that the concentration of modifying moieties present on the surface of the polyolefin article is at least about 0.1 percent of the total surface area, preferably at least about 2.0 percent of the total surface area.

In a second aspect, the present invention concerns a method for providing an article made from a generally hydrophobic polyolefin with a modified surface. The method comprises the step of contacting the surface of an article comprising a generally hydrophobic polyolefin with a copolymeric material comprising a generally hydrophobic moiety and a modifying moiety. The generally hydrophobic polyolefin and the copolymeric material are as described above. The surface of the polyolefin article is contacted with the copolymeric material when the contacted polyolefin is at a temperature above its glass transition temperature. Any method in which the polyolefin and the copolymeric material come into contact while the polyolefin is at a temperature above its glass transition temperature is suitable for use in the present invention.

In one preferred embodiment of the method according to the present invention the polyolefin and copolymeric material are brought into contact immediately after the polyolefin has been extruded. For example, when it is desired to form a polyolefin fiber exhibiting hydrophilic characteristics, applicants have discovered that it is particularly desirable to cause the copolymeric material (having a hydrophilic modifying moiety) to contact the polyolefin immediately after the polyolefin has been extruded; for example, in the shape of a fiber.

In one embodiment, an aqueous solution of the copolymeric material can be sprayed on the polyolefin as it exits a die tip. Such a process has been found to produce a polyolefin having a particularly non-fugitive, hydrophilic surface. Specifically, as the polyolefin exits the die it undergoes a phenomenon known to those skilled in the art as die swell. "Die swell" refers to the situation where a material extruded under pressure from a die expands after extrusion. By contacting the polyolefin with the copolymeric material as the polyolefin is experiencing die swell it is believed that better entanglement is achieved between the polyolefin and the generally hydrophobic moieties of the copolymeric material. Nonetheless, it is to be understood that it is not necessary to contact the polyolefin with the copolymeric composition while the polyolefin is undergoing die swell so long as the polyolefin and the copolymeric composition are in contact while the polyolefin is at a temperature above its glass transition temperature.

In the situation wherein the copolymeric material is applied to the polyolefin as the polyolefin is exiting a die in the form of a fiber, the copolymeric composition is suitably applied to the polyolefin in the form of an aqueous solution or dispersion containing from about 0.1–10, preferably from about 0.5–3.0, weight percent of the copolymeric composition based on total weight of the aqueous solution.

Alternatively, the article comprising a polyolefin can be formed and cooled to a temperature below the glass transition temperature of the polyolefin. The copolymeric material can then be applied to the surface of the article and the article heated to a temperature above the glass transition temperature of the polyolefin. As a general rule, the higher the temperature, the less time required at such temperature to achieve a desired degree of entanglement between the hydrophobic moiety and the polyolefin.

In another aspect, Applicants have discovered that the polyolefin fibers treated with copolymeric materials according to the present invention possess an improved hand. That is, the polyolefin articles of the present invention, when in the shape of fibers and formed into woven or nonwoven webs, are tactilely perceived as being softer than similar polyolefin fibers not treated with the copolymeric materials according to the present invention. It is hypothesized, without intending to be bound by such hypothesis, that this improved hand occurs as a result of a lowered coefficient of friction between the individual fibers due to the presence of the copolymeric material. To the extent the improved hand results from the presence of the copolymeric material, it is again important that the copolymeric material be generally nonfugitive so that washing does not remove the copolymeric material, thereby removing the desirably soft hand.

Polyolefin fibers modified according to the present invention to have a hydrophilic surface have been found to be suitable for use in personal care products, such as diapers, adult incontinence products, feminine napkins, bandages, and the like. In such a use, the polyolefin fibers according to the present invention are formed into nonwoven fabrics such as melt blown fabrics spunbonded fabrics and the like. The nonwoven fabrics will generally have a density of from about 0.005 to about 0.3 gram per cubic centimeter. Such nonwoven fabrics can be employed in a diaper as a component other than the back sheet since the nonwoven fabrics will allow multiple insults of urine to pass therethrough. Diapers and similar products are generally described in U.S. Pat. Nos. 4,710,187 issued Dec. 1, 1987 to Boland et al.; 4,762,521 issued Aug. 9, 1988, to Roessler et al.; 4,770,656 issued Sep. 13, 1988, to Proxmire et al.; and 4,798,603 issued Jan. 17, 1989 to Meyer et al., which references are incorporated herein by reference.

The present invention can best be understood by reference to the following examples (including comparative examples) which examples are not intended to limit, in any way, the scope of the invention as set forth in the claims.

EXAMPLES

In all of the following examples, the following test procedures are used. All percentages are by weight unless otherwise specifically stated.

Run-Off Test

FIG. 1 illustrates the apparatus used in performing these run-off determinations. With reference to FIG. 1, an inclined platform 10 is provided. Platform 10 includes a base 12 and an inclined surface 14. The inclined surface 14 has a width of 14 inches and a length along its transverse centerline of 22 inches. The inclined surface 14 is inclined at an angle of 30°. Located at a bottom edge 16 of inclined plane 14 are V-shaped barrier means 18. V-shaped barrier means 18 serve to funnel liquid running down inclined surface 14 into a hole 20 located in the center of V-shaped barrier means 18. Suspended above inclined surface 14 is a dispensing funnel 22. Dispensing funnel 22 is adapted to hold 100 milliliters of a liquid, which liquid can be released through valve 24 onto inclined surface 14. The height of valve 24 above inclined surface 14 is adjustable to allow for a clearance of 10 millimeters between valve 24 and a sample to be tested when in position on inclined surface 14. A generally rectangular test sample 8 inches wide (20.32 centimeters) and 15 inches long (38.1 centimeters) is provided. The test sample is mounted on inclined surface 14 with tape at each of its 4 corners. The test sample is generally centered on inclined surface 14 and the funnel 22 located approximately 7.8 inches (200 millimeters) from the bottom (lowest edge) of the test sample and transversely centered on said sample. The valve 24 is located approximately 10 millimeters above the top surface of the test sample. One hundred milliliters of water is placed in funnel 22. The water has a temperature of 35° C. A collection device is placed under hole 20. Valve 24 is opened to dispense the 100 milliliters of water contained in funnel 22 over a period of about 15 seconds. The amount of water which runs off and is collected in the collection means is determined and recorded.

Wash/Dry Cycle

A generally rectangular test sample 8 inches wide (20.32 centimeters) and 15 inches long (38.1 centimeters) is provided. The test sample is placed in one liter of room-temperature (about 23. C.) water. The sample is allowed to remain in the water for 2 minutes while being stirred at 15–20 revolutions per minute by a mechanical stirrer. The test sample is then removed from the wash water and excess liquid squeezed back into the wash water. The sample is allowed to air dry overnight and the process is repeated the desired number of times. The surface tension of the wash water is determined after each wash/dry cycle with fresh water being used for each wash/dry cycle. The surface tension of the water is determined according to ASTM test method D 1590-60 using a Fischer TM tensiometer.

Example 1

Meltblown polyethylene and polypropylene webs are made in the following manner. Polyethylene pellets commercially available from Dow Chemical under the trade designation Aspun TM and polypropylene pellets commercially available from Himont, under the trade designation PF015 are provided. The pellets are dried in a Whitlock TM dryer (desiccated air) for a minimum of 2 hours at 220° F. The pellets are then transferred to a Johnson Plastics Extruder and extruded in a meltblown process. The webs are formed under slightly different processing conditions as set forth in more detail in Table 1. As the polymer exits the die tip, an aqueous solution of 1 or more of the following materials is applied thereto:

Mapeg TM CO-8, an ethoxylated castor oil, which is commercially available from Mazer Chemicals under the trade designation CO-8; and Mapeg TM DO-400, an ethoxylated dioleate which is commercially available from Mazer Chemicals.

The concentration of the various materials present in the aqueous solution is set forth in Table 1. The aqueous solutions are sprayed on the polymer as it exits the die tip in a molten condition. The aqueous solutions are sprayed on the molten polymer by a spray boom which solutions are delivered to the spray boom by a Master Flex TM pump. The spray is applied such that 1 oz. of polymer receives about 1 oz. (2.83 grams) of aqueous solution. All of the meltblown webs have the basis weights set forth in Table 1.

Control samples of a polyethylene (Sample 1) and polypropylene (Sample 2) meltblown webs are prepared without the addition of any aqueous solution as the polymer exits the die tip. The various forming conditions and the polymer employed are set forth in Table 1.

The samples so prepared are then subjected to the run-off test and wash/dry cycle test described above. The results of these tests are set forth in Table 2.

TABLE 2

| | Sample No. | | | | | |
|---|---|---|---|---|---|---|
| | 1* | 2* | 3 | 4 | 5 | 6 |
| Wash/Dry Cycle[1] | | | | | | |
| Cycle 1 | — | — | 15.0 | 18.1 | 12.8 | 23.3 |
| Cycle 2 | — | — | 4.6 | 14.2 | 2.7 | 0.3 |
| Cycle 3 | — | — | 2.9 | 4.5 | 2.0 | 0 |
| Run-Off[2] | | | | | | |
| Initial | 100 | 100 | 0 | 0 | 0 | 0 |
| 1 Wash | 100 | 100 | 0 | 1 | 0 | 0 |
| 2 Wash | 100 | 100 | 0 | 0 | 0 | 0 |
| 3 Wash | 100 | 100 | 0 | 0 | 7 | 0 |

*Not an example of the present invention
[1]Reported as change in surface tension in dynes per centimeter
[2]Reported as milliliters collected As can be seen from reference to Table 2, test samples according to the present invention release some amount of the copolymeric material during the wash/dry cycle. Nonetheless, the run-off data indicates the samples remain wettable. Non-wettable samples (1 and 2) cause essentially all of the water to run off the test sample and be collected. Wettable samples according to the present invention (3-6) allow water to pass into and be retained by the test samples. This is true even after 3 washes.

Example 2

Spunbond sample webs of polypropylene having a basis weight of 0.7 ounce per square yard (23.7 gram per square meter) are post-formation treated by immersing the samples in an aqueous solution containing 2 weight percent of CO-8, based on the total weight of the aqueous solution. The samples are then placed in an oven and elevated to a temperature (~250° F.) above the glass transition temperature of the polypropylene for a period of about 15 seconds. Control samples of the polypropylene webs are also prepared. The control webs are either untreated or are treated with a nonionic surfactant, commercially available from Rohm and Haas under the trade designation Triton TM X-102. The control webs treated with Triton TM are immersed in

TABLE 1

| | Sample Numbers | | | | | |
|---|---|---|---|---|---|---|
| | 1* | 2* | 3 | 4 | 5 | 6 |
| Polymer Type[1] | PE | PP | PP | PP | PE | PE |
| Barrel Zone 1 (F.°) | 480 | 550 | 550 | 550 | 480 | 480 |
| 2 | 500 | 570 | 570 | 570 | 500 | 500 |
| 3 | 520 | 580 | 580 | 580 | 520 | 520 |
| Transfer Zones (1-2) (F.°) | 530 | 590 | 590 | 590 | 530 | 530 |
| Valve Zone (F.°) | 520 | 590 | 590 | 590 | 520 | 520 |
| Die Zones (1-5) (F.°) | 530 | 590 | 590 | 590 | 530 | 530 |
| Die Temperature (F.°) | 524 | 593 | 593 | 595 | 524 | 523 |
| Barrel Pressure (×10) (psig) | 35 | 43 | 43 | 44 | 35 | 35 |
| Die Pressure (psig) | 175 | 150 | 150 | 151 | 175 | 176 |
| Screw Speed (RPM) | 90 | 90 | 90 | 90 | 90 | 90 |
| Extruder Motor Amps | 50 | 80 | 80 | 80 | 50 | 50 |
| Polymer Throughput (lbs/hr) | 1.7 | 1.5 | 1.5 | 1.5 | 1.7 | 1.7 |
| Chromalox Temperature (F.°) | 543 | 588 | 588 | 589 | 543 | 545 |
| Chromalox Air Pressure (psi) | 4.0 | 5.0 | 5.0 | 5.0 | 4.0 | 4.0 |
| Additive | None | None | CO-8 | CO-8 | DO-400 | DO-400 |
| Concentration (% additive in water) | — | — | 2 | 2 | 2 | 2 |
| Spray Rate (ml/minute) | — | — | 400 | 400 | 400 | 400 |
| Forming Drum Vacuum (in. of water) | 2 | 2 | 2 | 2 | 2 | 2 |
| Forming Distance, Horizontal (inch) | 0 | 0 | 0 | 0 | 0 | 0 |
| Forming Distance, Vertical (inch) | 12 | 12 | 12 | 12 | 12 | 12 |
| Basis Weight (web) (gsm) | 14.5 | 14.5 | 14.5 | 29.0 | 14.5 | 29.0 |

*not an example of the present invention
[1]PE = polyethylene; PP = polypropylene an aqueous solution containing 2 weight percent of the Triton TM. Several samples are not subjected to heat treatment above the glass transition temperature of the polypropylene. The samples are then subjected to the run-off test described above. The results of this testing are set forth in Table 3.

TABLE 3

| Polymer | Additive | Temp. (°C.) | Time (sec.) | Run-Off Test[1] | | | | | | | | |
|---|---|---|---|---|---|---|---|---|---|---|---|---|
| | | | | | Wash Number[2] | | | | | | | |
| | | | | Initial | 1 | 2 | 3 | 4 | 5 | 6 | 7 | 8 |
| PP | CO-8 | ~250° F. | ~15 | 0 | 1.5 | 2.3 | 3.0 | 5.0 | 10.2 | 13.0 | 15.0 | 3.0 |
| PP* | — | ~250° F. | ~15 | 100 | 100 | 100 | 100 | 100 | 100 | 100 | 100 | 100 |
| PP* | Triton | ~250° F. | ~15 | 0 | 100 | 100 | 100 | 100 | 100 | 100 | 100 | 100 |
| PP* | CO-8 | — | — | 0 | 100 | 100 | 100 | 100 | 100 | 100 | 100 | 100 |
| PP* | Triton | — | — | 0 | 100 | 100 | 100 | 100 | 100 | 100 | 100 | 100 |

*Not an example of the present invention.
[1]Reported as milliliters collected
[2]Wash conducted as set forth in the wash/dry cycle test method As can be seen from reference to Table 3, only the sample according to the present invention possesses low run-off values after the first wash. This indicates the durable character of the surface treatments of the present invention. Control samples having a low initial run-off have a high run-off after the first wash due to the nondurable character of the surface treatments.

Those skilled in the art will recognize that the present invention is capable of many modifications and variations without departing from the scope thereof. Accordingly, the detailed descriptions and examples set forth above are meant to be illustrative only and are not meant to limit, in any manner, the scope of the invention as set forth in the following claims.

What is claimed is:

1. A method for providing an article comprising a generally hydrophobic polyolefin with a modified surface, the steps of the method comprising:
   contacting the surface of said generally hydrophobic polyolefin with a copolymeric material while said hydrophobic polyolefin is at a temperature above its glass transition temperature whereby the copolymeric material is heat fused to said hydrophobic polyolefin, said copolymeric material comprising a generally hydrophobic moiety soluble in said polyolefin and a modifying moiety generally insoluble in said polyolefin.

2. The method according to claim 1 wherein upon contact, said generally hydrophobic moiety is dissolved within said polyolefin and said modifying moiety remains generally at the surface of said polyolefin.

3. The method according to claim 2 wherein said polyolefin is substantially molten during said contacting steps.

4. The method according to claim 1 further comprising the step of extruding said generally hydrophobic polyolefin prior to contacting the surface of said polyolefin with said copolymeric material.

5. The method according to claim 4 wherein said generally hydrophobic polyolefin is extruded immediately prior to contacting said polyolefin with said copolymeric material such that the polyolefin is undergoing die swell during said contacting step.

6. The method according to claim 1 wherein said copolymeric composition is in the form of an aqueous solution during the contacting step.

7. The method according to claim 6 wherein the polyolefin is undergoing die swell at the point said copolymeric composition contacts said polyolefin.

8. The method according to claim 1 wherein the modifying moiety is hydrophilic.

9. The method according to claim 8 wherein the modifying moiety is represented by the formula:

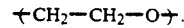

10. A method for providing an article comprising a generally hydrophobic polyolefin with a generally hydrophilic surface, the steps of the method comprising:
    melting said generally hydrophobic polyolefin to form a molten polyolefin;
    extruding said molten polyolefin under a pressure sufficient to cause the molten polyolefin to undergo die swell immediately after extrusion; and
    applying a copolymeric material to said molten polyolefin immediately after extrusion such that the molten polyolefin is undergoing die swell at the time of application of said copolymeric material, said copolymeric material comprising a generally hydrophobic moiety generally soluble in said molten polyolefin and a generally hydrophilic moiety generally insoluble in said molten polyolefin.

11. The method according to claim 10 further comprising the step of quenching the molten polyolefin after application of said copolymeric material thereto.

* * * * *

UNITED STATES PATENT AND TRADEMARK OFFICE
CERTIFICATE OF CORRECTION

PATENT NO. : 5,200,130
DATED : April 6, 1993
INVENTOR(S) : Randy E. Meirowitz and Robert J. Phelan It is certified that error appears in the above-identified patent and that said Letters Patent is hereby corrected as shown below:

Column 4,
Line 43, delete "S" and substitute -- s --.

Column 10,
Line 61, delete "23." and substitute -- 23º --.

Table 3,
In the third column heading of Table 3, delete "(ºC.)" and substitute -- (ºF.) --.

Signed and Sealed this

Seventeenth Day of September, 2002

*Attest:*

JAMES E. ROGAN
*Attesting Officer*      *Director of the United States Patent and Trademark Office*